United States Patent
Zuo et al.

(10) Patent No.: US 11,650,406 B2
(45) Date of Patent: May 16, 2023

(54) MICROSCOPIC IMAGING METHOD OF PHASE CONTRAST AND DIFFERENTIAL INTERFERENCE CONTRAST BASED ON THE TRANSPORT OF INTENSITY EQUATION

(71) Applicant: NANJING UNIVERSITY OF SCIENCE AND TECHNOLOGY, Jiangsu (CN)

(72) Inventors: Chao Zuo, Nanjing (CN); Qian Chen, Nanjing (CN); Jiasong Sun, Nanjing (CN); Yuzhen Zhang, Nanjing (CN); Guohua Gu, Nanjing (CN)

(73) Assignee: NANJING UNIVERSITY OF SCIENCE AND TECHNOLOGY, Jiangsu (CN)

( * ) Notice: Subject to any disclaimer, the term of this patent is extended or adjusted under 35 U.S.C. 154(b) by 117 days.

(21) Appl. No.: 17/294,019

(22) PCT Filed: Jul. 5, 2019

(86) PCT No.: PCT/CN2019/094797
§ 371 (c)(1),
(2) Date: May 14, 2021

(87) PCT Pub. No.: WO2020/103466
PCT Pub. Date: May 28, 2020

(65) Prior Publication Data
US 2022/0011563 A1 Jan. 13, 2022

(30) Foreign Application Priority Data
Nov. 22, 2018 (CN) .......................... 201811396945.4

(51) Int. Cl.
G02B 21/36 (2006.01)
G02B 27/12 (2006.01)
H04N 5/225 (2006.01)

(52) U.S. Cl.
CPC ......... G02B 21/367 (2013.01); G02B 27/126 (2013.01); H04N 5/2256 (2013.01)

(58) Field of Classification Search
CPC ... G02B 21/367; G02B 27/126; H04N 5/2256
(Continued)

(56) References Cited

U.S. PATENT DOCUMENTS 6,262,818 B1 7/2001 Cuche et al.
2003/0199752 A1 10/2003 Sakaida
(Continued)

FOREIGN PATENT DOCUMENTS

CN 102998789 A 3/2013
CN 103364416 A 10/2013
(Continued)

OTHER PUBLICATIONS

International Search Report issued in PCT/CN2019/094797 (PCT/ISA/210), dated Oct. 9, 2019.
(Continued)

*Primary Examiner* — Jayanti K Patel
*Assistant Examiner* — Richard B Carter
(74) *Attorney, Agent, or Firm* — Birch, Stewart, Kolasch & Birch, LLP (57) ABSTRACT

A microscopic imaging method of phase contrast (PC) and differential interference contrast (DIC) based on the transport of intensity equation (TIE) includes capturing three intensity images along the optical axis; solving the TIE by deconvolution to obtain the quantitative phase; obtaining the intensity image under the DIC imaging mode according to the DIC imaging principle; and obtaining the corresponding
(Continued)

phase image of PC imaging mode according to the PC imaging principle. The method can endow the bright-field microscope with the ability to realize PC and DIC imaging without complex modification of the traditional bright-field microscope. In addition, it has the same imaging performance as the phase contrast microscope and differential interference contrast microscope, which are expensive, complex-structure, and has strict environmental conditions.

7 Claims, 5 Drawing Sheets

(58) Field of Classification Search
USPC .................. 348/8, 79; 356/497; 702/189
See application file for complete search history.

(56) References Cited

U.S. PATENT DOCUMENTS

| | | | | |
|---|---|---|---|---|
| 2005/0057756 | A1* | 3/2005 | Fang-Yen | G01B 9/02057 356/497 |
| 2015/0100278 | A1* | 4/2015 | Gaylord | G02B 21/367 702/189 |
| 2016/0139388 | A1* | 5/2016 | Asundi | G02B 26/06 348/79 |
| 2017/0059845 | A1* | 3/2017 | Waller | G06T 5/10 |
| 2020/0271910 | A1* | 8/2020 | Tsuchida | G02B 21/0056 |
| 2021/0156782 | A1* | 5/2021 | Holm | G01N 15/0227 |

FOREIGN PATENT DOCUMENTS

| | | | |
|---|---|---|---|
| CN | 106768396 | A | 5/2017 |
| CN | 106842540 | A | 6/2017 |
| CN | 107024763 | A | 8/2017 |
| CN | 107290846 | A | 10/2017 |
| CN | 108051930 | A | 5/2018 |
| CN | 109581645 | A | 4/2019 |

OTHER PUBLICATIONS

Kou et al., "Transport-of-intensity approach to differential interference contrast (TI-DIC) microscopy for quantitative phase imaging", Optics Letters, vol. 35, No. 3, Feb. 1, 2010, pp. 447-449.

Zuo et al., "Non-Interferometric Phase Retrieval and Quantitative Phase Microscopy Based on Transport of Intensity Equation: A Review", Chinese Journal of Lasers, vol. 43, No. 6, Jun. 30, 2016, pp. 0609002-1-0609002-31 (Total No. pp. 32).

* cited by examiner

MICROSCOPIC IMAGING METHOD OF PHASE CONTRAST AND DIFFERENTIAL INTERFERENCE CONTRAST BASED ON THE TRANSPORT OF INTENSITY EQUATION

FIELD OF THE INVENTION

The invention belongs to the optical microscopic measurement, imaging technology, especially the microscopic imaging method of phase contrast and differential interference contrast based on the transport of intensity equation.

BACKGROUND OF THE INVENTION

In the field of biomedical microscopy imaging, most samples are phase objects with a uniform distribution of amplitude transmittance and an uneven distribution of refractive index or thickness. Therefore, when light waves pass through a phase object, the wavelength and amplitude change very little, while the phase changes dramatically (Schmalz J A, Gureyev T E, Paganin D M, et al. *Phase retrieval using radiation and matter-wave fields: Validity of Teague's method for solution of the transport-of-intensity equation*[J]. *Physical Review A*, 2011, 84(2): 023808). However, the human eye and optical detectors are unable to observe this phase difference with important information. To address this challenge, academics usually take the approach of staining the sample. The different affinities of different intracellular components for different chemical or fluorescent dyes are exploited to create a sufficiently large contrast in intensity or to generate different spectra for the purpose of cell imaging. Fluorescence microscopy and laser confocal microscopy are widely used to display the structural and functional properties of cells by selectively labeling specific molecules within the cells. However, both traditional dye staining methods and fluorescent labeling staining methods are not conducive to cellular research in the biomedical field because the labeling means are not able to observe living cells for a long time due to the damage to the cells (Sander P, Nehorai A. *Deconvolution methods for 3-D fluorescence microscopy images*[J]. *IEEE Signal Processing Magazine*, 2006, 23(3): 32-45).

In the study of dynamic microscopic imaging of living cells, label-free imaging is an effective imaging modality. It can be divided into phase visualization methods and phase measurement methods. The most common phase visualization methods are Phase Contrast (PC) microscopy and Differential Interference Contrast (DIC) microscopy. In 1935, the Dutch scientist Zernike invented phase contrast microscopy, which transformed the optical path length through different parts of the object into a difference in amplitude (light intensity), allowing the observation of unstained specimens by obtaining phase images with high contrast (Zuo Chao, Chen Qian, Sun Jiasong. Non-interferometric phase recovery and quantitative phase microscopic imaging based on the light intensity transport equation: a review of the literature and recent advances [1]. (China Laser, 2016, 43(6): 0609002.). However, this method can obtain qualitative phase images, does not involve quantitative analysis, and requires the use of a special condenser with annular diaphragm and phase contrast objective lens with phase plate, which are complex and expensive. 2015 Laura Waller's group in the United States proposed a digital phase contrast technique based on array light sources with structured light illumination, which uses LED array to obtain microscopic images with different illumination directions. The digital phase contrast algorithm is used to synthesize digital phase contrast microscopic images. This method has a simple structure and can be used to obtain quantitative phase contrast images quickly. However, due to the limitation of the numerical aperture of the light source, it is not effective for imaging phase objects (cells, etc.) (Tian L, Waller L. Quantitative differential phase contrast imaging in an LED array microscope [J]. Optics express, 2015, 23(9): 11394-11403). 2017 Guangdong OPPMANDI Technology Co., Ltd. proposed a dual-channel structured light digital phase contrast microscope imaging system (CN206920698U), which reduces external perturbation by simultaneous acquisition of images through an image acquisition module composed of two cameras, with less interference from the outside world and can obtain the phase contrast image in real-time. However, this method requires the addition of an unpolarized spectroscopic prism and an additional camera, which makes the structure complicated and the cost increased.

DIC microscopy is a wavefront shear interference technique that uses the principle of polarized light interference. The phase change of the sample can be expressed in the form of intensity, where the areas with large phase gradients have high contrast in the field of view and show a "pseudo-stereoscopic" effect (Fu D, Oh S, Choi W, Yamauchi T, Dorn A, Yaqoob Z, et al. Quantitative DIC microscopy using an off-axis self-interference approach. Opt. Lett. 2010; 35:2370-2372). However, this method only supports qualitative analysis of phase images and requires the use of complex experimental equipment: two sets of polarizers and polarization beam splitting prisms (Wollaston prism or Nomarski prism). In 2012, Zeng Shaoqun of Huazhong University of Science and Technology and others proposed a super-resolution differential interference phase contrast microscopy imaging system and microscopy imaging method (CN102998789A), which solved the problem of low imaging contrast of structured light and scattered light imaging, thus realizing the high-contrast super-resolution imaging of biological sample without processing. However, the spatial light modulator used is expensive, and its refresh speed limits the frame rate of image acquisition. It cannot be applied to DIC imaging in the high-speed changing process. In addition, there is the problem that the polarization state of light affects the modulation effect of light by the spatial light modulator Therefore, how to achieve quantitative, high-speed, and low-cost phase contrast and differential interference contrast imaging in a bright-field microscope without additional complex devices has become a technical challenge in the observation of label-free samples by computational microscopy imaging.

SUMMARY OF THE INVENTION

The purpose of the present invention is to provide a microscopic imaging method of phase contrast (PC) and differential interference contrast (DIC) based on the transport of intensity equation (TIE), which can realize phase contrast and differential interference contrast imaging by bright-field microscopy without complex modification of the conventional bright-field microscope.

The technical solution to achieve the purpose of the present invention is:

Compared with the prior art, the invention has significant advantages: (1) Simple structure. It can be directly realized on the traditional bright-field microscope without adding the complicated hardware required for traditional PC imaging and DIC imaging. The proposed method can achieve the same imaging effect as traditional PC imaging and DIC imaging (expensive, complex, and demanding in environmental conditions), which not only reduces the complexity of the device but also ensures the imaging quality. (2) Non-interference. It can work well under partially coherent illumination, so the working environment is not demanding and the application field is wider. (3) Low cost. Only the traditional bright-field microscope does not need to use additional complicated devices, which solves the problem of expensive components in the existing phase contrast imaging system, and avoids the problem of the spatial light modulator being sensitive to the polarization of light.

The invention is further described in detail below with reference to the accompanying drawings.

BRIEF DESCRIPTION OF THE DRAWINGS

FIG. 3(a) is the phase contrast ring under annular phase contrast; FIG. 3(b) represents the relationship between the amplitude transmittance (T) and the ring radius (r) of the phase contrast ring half-section under annular phase contrast; where FIG. 3(c) shows the relationship between the phase (P) and the ring radius (r) of the phase contrast ring half-section under annular phase contrast (or apodization phase contrast) (positive phase contrast case); where FIG. 3(d) displays the phase contrast ring under apodization annular phase contrast FIG. 3(e) shows the relationship between the amplitude transmittance (T) and the ring radius (r) of the phase difference ring half-section under apodization phase contrast; FIG. 3(f) represents the relationship between the phase (P) and the ring radius (r) of the phase difference ring half-section under annular phase contrast (or apodization phase contrast) (negative phase contrast case).

FIG. 4(a1) shows the phase difference plate under the ring phase contrast; FIG. 4(a2) represents the phase difference plate under the apodization phase contrast; FIG. 4(a3) shows the Amplitude Transfer Function (ATF) of the ring phase contrast; FIG. 4(a4) is the ATF of the apodization phase contrast; FIG. 4(b1) shows the Phase Transfer Function (PTF) of the ring positive phase contrast; FIG. 4(b2) is the PTF of the apodization positive phase contrast; FIG. 4(b3) displays the PTF of the annular negative phase contrast; FIG. 4(b4) shows the PTF of the apodization negative phase contrast; FIG. 4(c1) shows the PTF of the annular phase contrast under annular illumination with the numerical aperture of the objective lens of 0.4; FIG. 4(c2) represents the annular phase contrast PTF of the annular illumination with the numerical aperture of the objective lens of 0.65; FIG. 4(c3) shows the annular phase contrast PTF under annular illumination with a numerical aperture of the objective lens of 0.75; FIG. 4(c4) is the annular phase contrast PTF under annular illumination with a numerical aperture of the objective lens of 1.25; FIG. 4(d1) is the apodization phase contrast PTF under annular illumination with a numerical aperture of the objective lens of 0.4; FIG. 4(d2) represents the apodization phase contrast PTF under annular illumination with the objective lens numerical aperture at 0.65; FIG. 4 (d3) shows the apodization phase contrast PTF under annular illumination at a numerical aperture of the objective lens at 0.75; FIG. 4 (d4) expresses the apodization phase contrast PTF under annular illumination at a numerical aperture of the objective lens at 1.25.

FIG. 5 (a) displays the quantitative phase image obtained from the transport of intensity equation (TIE); FIG. 5 (b) shows the annular positive phase contrast light intensity image; FIG. 5 (c) expresses the apodization positive phase contrast light intensity image; FIG. 5 (d) shows the differential interference contrast (DIC) light intensity image; FIG. 5 (e) represents the annular negative phase contrast light intensity image; FIG. 5 (f) displays the apodization negative phase contrast light intensity image.

DESCRIPTION OF THE PREFERRED EMBODIMENT

Figure 1:
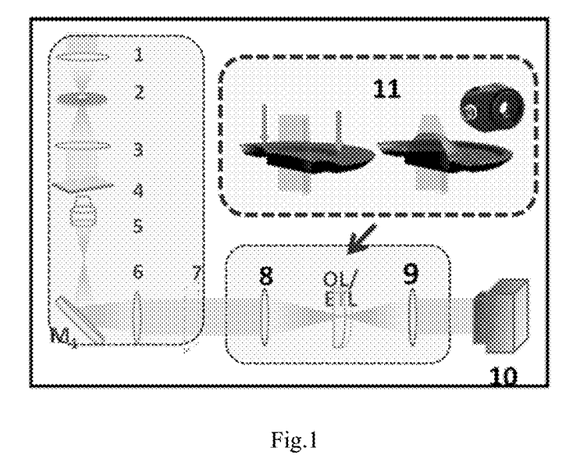
FIG. 1 is a schematic diagram of the optical path of the microscopic imaging microscope based on the transport of intensity equation for phase contrast and differential interference contrast.

As shown in FIG. 1, the present invention is based on a microscopic imaging system equipped with an adjustable lens module with a standard 4F relay system, the actual hardware platform of which is an inverted Olympus IX71 microscope (it is composed of condenser 1, aperture stop 2, condenser lens 3, objective lens 5, and imaging tube lens 6 in FIG. 1). The microscope was equipped with an Olympus camera 10 (Olympus UC50, resolution 2588 pixels×1960 pixels, 3.4 µm/pixel) for image acquisition and an electronically controlled zoom lens (EL-C-10-30-VISLD, Optotune AG) module 11 for precise zooming. This system is controlled by software via the USB interface and ensures the synchronization of the camera 10 acquisition and the electronically controlled zoom lens module 11 zoom in the direction perpendicular to the focal plane (z-axis). The image stack is acquired by camera 10 after passing through a long working distance planar semi-complex achromatic objective 5 (Olympus, LUCPLFLN 40×, NA 0.6). It can be seen from FIG. 1 that the back focal plane of the objective lens 5 coincides with the front focal plane of the imaging tube lens 6, and the imaging plane of the camera 10 is placed at the back focal plane position of the 4F relay system behind the imaging tube 6 (composed of lenses 8, 9 in FIG. 1). During imaging, the sample 4 to be tested on the stage is adjusted to the position of the front focal plane of the objective lens 5 to form an infinity-corrected imaging system. An electronically controlled zoom lens module 11 is placed on the spectrum surface of the standard 4F relay system. The light is condensed by the condenser 1 and becomes part of the coherent light that illuminates the sample 4 to be tested. The sample 4 to be tested is placed on the stage. The light passes through the sample 4, passes through the imaging tube lens 6, and then converges through the electronically controlled zoom. The lens module 11 is modulated to illuminate the imaging plane 7 of the camera 10, and a series of intensity images can be collected.

Figure 2:
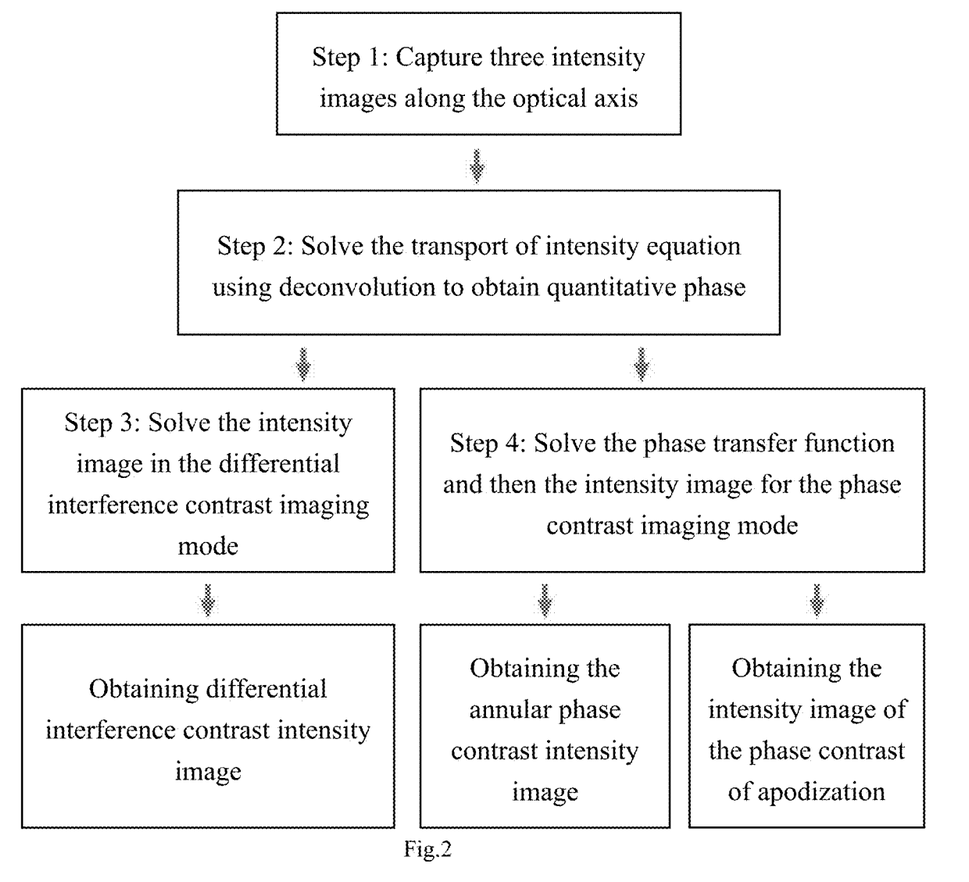
FIG. 2 is a flowchart of the microscopic imaging method of phase contrast and differential interference contrast based on the transport of intensity equation.

With reference to FIG. 2, the present invention utilizes the above-mentioned device to realize the phase contrast (PC) and differential interference contrast (DIC) based on the transport of intensity equation (TIE), including the following four steps:

Step 1, three intensity images are acquired along the optical axis, and the process is as follows: three intensity images are acquired along the optical axis: positive defocus image $I_{z-P}$, infocus image $I_0$, and negative defocus image $I_{z-N}$. The first-order axial differentiation $\partial I/\partial z$ of the intensity I is obtained by using numerical difference estimation $$\frac{\partial I}{\partial z} = \frac{I_{z-P} - I_{z-N}}{dz}$$

where dz is the distance between the positive defocus image $I_{z-P}$ and the negative defocus image $I_{z-N}$ in the Z axial direction, and the value is generally $5 \times 10^{-6}$ m.

Step 2, obtain the quantitative phase image $\phi$ based on the TIE. The procedure is as follows: solve the TIE using the first-order axial differentiation ova, obtained in Step 1

$$-k\frac{\partial I}{\partial z} = \nabla \cdot (I \nabla \phi)$$

obtain the quantitative phase image $\phi$ $$\phi = -k\nabla^{-2}\nabla \cdot \left( I^{-1}\nabla\nabla^{-2}\frac{\partial I}{\partial z} \right)$$

where k is the wave number, it can be expressed as $k=2\pi/\lambda$ ($\lambda$ is the wavelength). And $\nabla$ is the gradient operator, · denotes the dot product, $\nabla^{-2}$ is the inverse Laplacian operator.

Step 3, solve TIE in the differential interference contrast (DIC) imaging mode. The specific implementation process is:

(1) Firstly, a beam of light passes through a Wollaston prism and divides into two coherent light fields with $\Delta x$, $\Delta y$ shear;

(2) Any one of them produces another phase shift of $\pi/2$, the other one remains unchanged;

(3) Finally, the two beams interfered and superimposed to form an intensity interferogram, that is, the final DIC image obtained. The specific process is as follows: First, the resulting object optical field U(x,y) is:

$$U(x,y)=\sqrt{I_0}\exp[i\phi(x,y)]$$

where $I_0$ is the focus image obtained in Step 1, $\phi(x,y)$ is the $\phi$ obtained in Step 2, then the light field $U_\Delta(x,y)$ after shearing $\Delta x, \Delta y$ and phase shifting $\pi/2$ is $$U_\Delta(x,y)=U(x+\Delta x,y+\Delta y)=$$
$$\sqrt{I(x+\Delta x,y+\Delta y)}\exp\{i[\phi(x+\Delta x,y+\Delta y)+\pi/2]\}$$

then the intensity image DIC(x,y) formed by U(x,y) and $U_\Delta(x,y)$ is $$DIC(x,y)=|U(x,y)+U_\Delta(x,y)|^2=|\sqrt{I_0}\exp[i\phi(x,y)]+$$
$$\sqrt{I(x+\Delta x,y+\Delta y)}\exp\{i[\phi(x+\Delta x,y+\Delta y)+\pi/2]\}|^2$$

where $\Delta x, \Delta y$ is integer N, its value is used to adjust the amount of shear and the positive and negative is used to adjust the direction of shear; DIC(x,y) is the obtained DIC intensity image. The solution for the special case of DIC imaging is as follows:

① For the case of uniform intensity there has $I_0=1$, then $$U(x,y)=\exp[i\phi(x,y)]$$

$$U_\Delta(x,y)=U(x+\Delta x,y+\Delta y)=\exp\{i[\phi(x+\Delta x,y+\Delta y)+\pi/2]\}$$

$$DIC(x,y)=|U(x,y)+U_\Delta(x,y)|^2=|\exp[i\phi(x,y)]+\exp\{i[\phi(x+\Delta y,y+\Delta y)+\pi/2]\}|^2$$

② For weakly phased objects for uneven intensity, i.e., $\phi(x,y)\square 1$, so $$U(x,y)=\sqrt{I_0}\exp[i\phi(x,y)]=\sqrt{I_0}[1+i\phi(x,y)]$$

$$DIC(x,y)=I_0\{1+[\phi(x,y)-\phi(x+\Delta x,y+\Delta y)]\}$$

③ For weakly phased objects for uniform intensity, thus $$U(x, y) = \exp[i\phi(x, y)] = 1 + i\phi(x, y)$$
$$U_\Delta(x, y) = U(x + \Delta x, y + \Delta y) =$$
$$\exp\{i[\phi(x+\Delta x, y+\Delta y)+\pi/2]\} = \exp(i\pi/2)[1 + i\phi(x+\Delta x, y+\Delta y)] =$$
$$i[1 + i\phi(x+\Delta x, y+\Delta y)] = i - \phi(x+\Delta x, y+\Delta y)$$
$$DIC(x, y) = |U(x, y) + U_\Delta(x, y)|^2 = 2 + 2[\phi(x, y) - \phi(x+\Delta x, y+\Delta y)] +$$
$$\underbrace{\phi^2(x+\Delta x, y+\Delta y) + \phi^2(x, y)}_{\approx 0}\square 1 + [\phi(x, y) - \phi(x+\Delta x, y+\Delta y)]$$

In this case, $\phi^2(x+\Delta x,y+\Delta y)+\phi^2(x,y)$ can be approximated as zero, so the DIC intensity image obtained in this case is $$DIC(x,y)=1+[\phi(x,y)-\phi(x+\Delta x,y+\Delta y)]$$

④ For the case of slowly varying intensity $\sqrt{I_0} \approx \sqrt{I(x+\Delta x,y+\Delta y)}$, there is $$DIC(x,y)=|$$
$$\sqrt{I(x+\Delta x,y+\Delta y)}\{\exp[i\phi(x,y)]+\exp\{i[\phi(x+\Delta x,y+\Delta y)+\pi/2]\}\}|^2.$$

(4) In practice, however, it is not only limited to integer shear quantities but also fractional shear quantities can be achieved. Then the solution, in this case, must be performed in the frequency domain:

$$U(x,y)=\sqrt{I_0}\exp[i\phi(x,y)]$$

$$U_\Delta(x,y)=\exp(i\pi/2)FFT^{-1}\{\hat{U}(u_x,u_y)\exp[i2\pi(u_x\Delta x+u_y\Delta y)]\}$$

$$DIC(x,y)=|U(x,y)+U_\Delta(x,y)|^2$$

The above method is a sub-pixel translation based on the Fourier domain, where $\hat{U}(u_x,u_y)=FFT\{U(x,y)\}$ is the Fourier transform of, $(u_x,u_y)$ is the Fourier-domain coordinate corresponding to the space domain coordinate (x,y) (i.e., the frequency-domain coordinate). The value of the shear $\Delta x, \Delta y$ is adjustable. When the shear $\Delta x, \Delta y$ is integer, it can be solved directly in the space domain, and when the shear $\Delta x, \Delta y$ is fractional number, it needs to be converted to the frequency domain. Meanwhile, the magnitude of the shear $\Delta x, \Delta y$ determines the convexity of the object in the DIC image, which is often within the range of (1,10); and the positive or negative shear value $\Delta y, \Delta y$ determines the shading direction of the object in the DIC image.

This step results in an intensity image in the DIC imaging mode DIC(x,y).

Step 4, solve the phase transfer function in the phase contrast (PC) imaging mode, and solve the intensity image in the PC imaging mode by the annular phase contrast method or the apodization phase contrast method.

The specific implementation process is: using the quantitative phase image obtained in Step 2, based on the phase contrast imaging theory to obtain the intensity image $I_{PC-A}$(u) obtained by the annular phase contrast method and the intensity image $I_{PC-B}$(u) obtained by the apodization phase contrast method. The first method is the annular phase contrast method: compared with the traditional phase contrast method, the difference is that the illumination is annular (instead of plane waves) and the phase contrast plate in the imaging system is annular (instead of a point in the middle)

[see FIG. 3(a), FIG. 3(b), FIG. 3(c), and FIG. 3(f) for the specific forms]. The intensity and phase of the object are obtained by phase recovery and the resulting object optical field U(x,y)

$$U(x,y)=\sqrt{I_0}\exp[i\phi(x,y)]$$

Thus, $$I(u) = B\delta(u) + A(u)ATF(u) + i\Phi(u)PTF(u)$$

$$B = \int\int L(u_j)|P(u_j)|^2 d^2 u_j$$

$$ATF(u) = \frac{-\int\int L(u_j)[P^*(u_j)P(u+u_j) + P(u_j)P^*(u-u_j)]d^2 u_j}{\int\int L(u_j)|P(u_j)|^2 d^2 u_j}$$

$$PTF(u) = \frac{\int\int L(u_j)[P^*(u_j)P(u+u_j) - P(u_j)P^*(u-u_j)]d^2 u_j}{\int\int L(u_j)|P(u_j)|^2 d^2 u_j}$$

where $I_0$ is the focus image obtained in Step 1, $\phi(x,y)$ is the phase image $\phi$ obtained in Step 2, u denotes the frequency coordinate in Fourier space; I(u) is the intensity spectrum distribution; B indicates background items; A(u) is the amplitude spectrum distribution of the sample; ATF(u) denotes the amplitude transfer function; $\Phi(u)$ is the phase spectrum distribution of the sample; PTF(u) denotes the phase transfer function; $u_j$ is the corresponding frequency shift vector caused by a single tilted illumination, j indicates different angles of illumination; $L(u_j)$ denotes the intensity distribution of the illumination source in the Fourier domain; P(u) is the pupil function of the objective lens; * denotes the conjugate operation. The above expressions are general expressions for the background term, amplitude transfer function and phase transfer function under complex illumination and are applicable to all illumination modes and pupil functions; therefore, in the case of annular phase contrast, the light source expression for the annular illumination mode L(u) is $$L(u) = \begin{cases} 1, & k_2^2 < u_x^2 + u_y^2 < k_1^2 \\ 0, & \text{others} \end{cases}$$

The pupil function under the annular phase contrast $P_{PC-A}(u)$ is $$P_{PC-A}(u) = \begin{cases} 1, & k_1^2 < u_x^2 + u_y^2 < k_0^2 \\ 0.25 \times \exp\left(i\frac{\pi}{2}\right), & k_2^2 < u_x^2 + u_y^2 < k_1^2 \\ 1, & u_x^2 + u_y^2 < k_2^2 \\ 0, & \text{others} \end{cases}$$

$$k_i = NA_i/\lambda (i = 0, 1, 2)$$

where $(u_x, u_y)$ is the Fourier-domain coordinate corresponding to the space domain coordinate (x,y), $\lambda$ is the wavelength, $k_0$ is the radius of the corresponding objective limit, $k_1$ is the outer diameter of the phase contrast ring, k2 is the inner diameter of the phase contrast ring. In the set of simulation experiments shown in FIGS. 4(a1), 4(a3), 4(b1), 4(b3), and 4(c1), the $NA_1=0.28$, $NA_2=0.25$, $NA_0=0.4$ are used. The ring illumination integration region corresponds to the phase difference ring (inner diameter is $k_2$, outer diameter is $k_1$). Then the annular phase contrast of $ATF_{PC-A}(u)$ and $PTF_{PC-A}(u)$ can be expressed as $$ATF_{PC-A}(u) = \frac{-\int\int L(u_j)[P^*_{PC-A}(u_j)P_{PC-A}(u+u_j) + P_{PC-A}(u_j)P^*_{PC-A}(u-u_j)]d^2 u_j}{\int\int L(u_j)|P_{PC-A}(u_j)|^2 d^2 u}$$

$$PTF_{PC-A}(u) = \frac{\int\int L(u_j)[P^*_{PC-A}(u_j)P_{PC-A}(u+u_j) - P_{PC-A}(u_j)P^*_{PC-A}(u-u_j)]d^2 u}{\int\int L(u_j)|P_{PC-A}(u_j)|^2 d^2 u_j}$$

Figure 4:
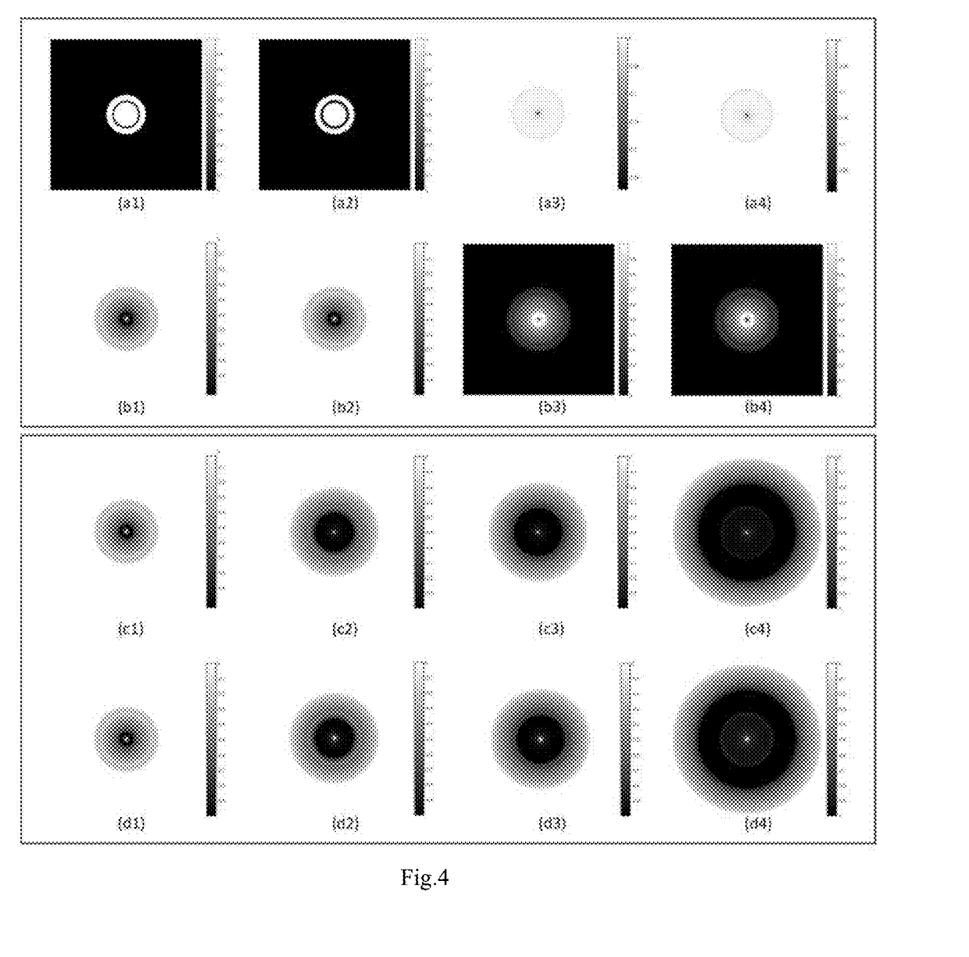
FIG. 4 displays the simulated images of the microscopic imaging method of phase contrast and differential interference contrast based on the transport of intensity equation.

The corresponding with $ATF_{PC-A}(u)$ and $PTF_{PC-A}(u)$ results are shown in FIG. 4(a3) and FIG. 4(b1). Under complex partially coherent illumination like annular phase contrast, the intensity distribution of the acquired image can be regarded as a linear superposition of the intensity at different angles, so we decompose the complex illumination into illumination at different angles for analysis. At this point, the annular illumination can be represented by the Fourier translation technique, so the Fourier transform of the complex amplitude on the camera plane satisfies $$W_j(u)=\sqrt{L(u_j)}[\delta(u-u_j)-A(u-u_j)+i\Phi(u-u_j)]P(u)$$

Thus, the spectral distribution of the intensity images acquired by the camera under single-angle tilt illumination can be written as a convolution of $W_j(u)$ and its complex conjugate $w_j^*(u)$:

$$(u)=W_j(u)\otimes W_j^*(u)=L(u_j)\delta(u)|P(u_j)|^2-L(u_j)A(u)[P^*(u_j)P(u+u_j)+P(u_j)P^*(u-u_j)]+iL(u_j)\Phi(u)[P^*(u_j)P(u+u_j)-P(u_j)P^*(u-u_j)]$$

In order to linearize the phase recovery, the cross-convolution term in the above equation is neglected. When the sample is partially illuminated by spatially coherent light, the resulting annular phase contrast intensity spectrum $I_{PC-A}(u)$ can be written as the sum of the intensity spectrum at multiple illumination angles $$I_{PC-A}(u)=B_{PC-A}\delta(u)+A(u)ATF_{PC-A}(u)\pm i\Phi(u)PTF_{PC-A}(u)$$

For the phase difference plate, the smaller the size, the higher the contrast of the low-frequency component; for the attenuation rate, it can be used to control the ratio of the low-frequency component to the high-frequency component—usually the larger the value taken the greater the attenuation and the higher the phase contrast (90%); for the phase shift amount, there are two cases of positive and negative phase contrast, the difference lies in the phase in the phase difference plate that the delay of the former is $+\pi/2$ and the delay of the latter is $-\pi/2$. The algorithm can obtain different annular phase contrast images by changing the value of the numerical aperture of the objective $NA_0$, where the simulation results of changing the numerical aperture of the objective $NA_0$ are shown in FIG. 4(c1) to FIG. 4(c4).

Another method based on phase contrast imaging theory is the apodization phase contrast method: the difference compared to the annular phase contrast method is the use of an apodization phase contrast plate. By using selective amplitude filters in the phase contrast plate located in the objective lens in the back focal plane adjacent to the phase film, the effect of reducing halos and improving the contrast of the sample can be achieved. These amplitude filters consist of neutral density filter films, and the films are applied to the phase contrast plate around the phase film. The transmittance of the phase shift ring in the latest variant phase difference plate is about 25%, while the pair of adjacent rings around the phase shift ring in the variant phase difference plate has neutral density, and the transmittance varies uniformly from 25% to 100% on both sides [see FIG. 3(d), FIG. 3(e), FIG. 3(c), and FIG. 3(f) for the specific form], and the width of the phase film is the same in both plates. The solution method is similar to the circular phase contrast, the difference is that the former is a step filter and the latter is a trapezoidal filter, i.e., the pupil function $P_{PC-B}(u)$ is different. It is expressed by the equation $$P_{PC-B}(u) = \begin{cases} 1, & k_1'^2 < u_x^2 + u_y^2 < k_0^2 \\ \frac{3}{4(k_1'-k_1)}u_x + \left[1 - \frac{3}{4(k_1'-k_1)}k_1\right], & k_1^2 < u_x^2 + u_y^2 < k_1'^2 \\ 0.25 \times \exp\left(i\frac{\pi}{2}\right), & k_2^2 < u_x^2 + u_y^2 < k_1^2 \\ \frac{-3}{4(k_2-k_2')}u_x + \left[1 + \frac{3}{4(k_2-k_2')}k_2\right], & k_2'^2 < u_x^2 + u_y^2 < k_2^2 \\ 1, & u_x^2 + u_y^2 < k_2'^2 \\ 0, & \text{others} \end{cases}$$

$$k_i = NA_i/\lambda (i = 0, 1, 2)$$

Figure 3:
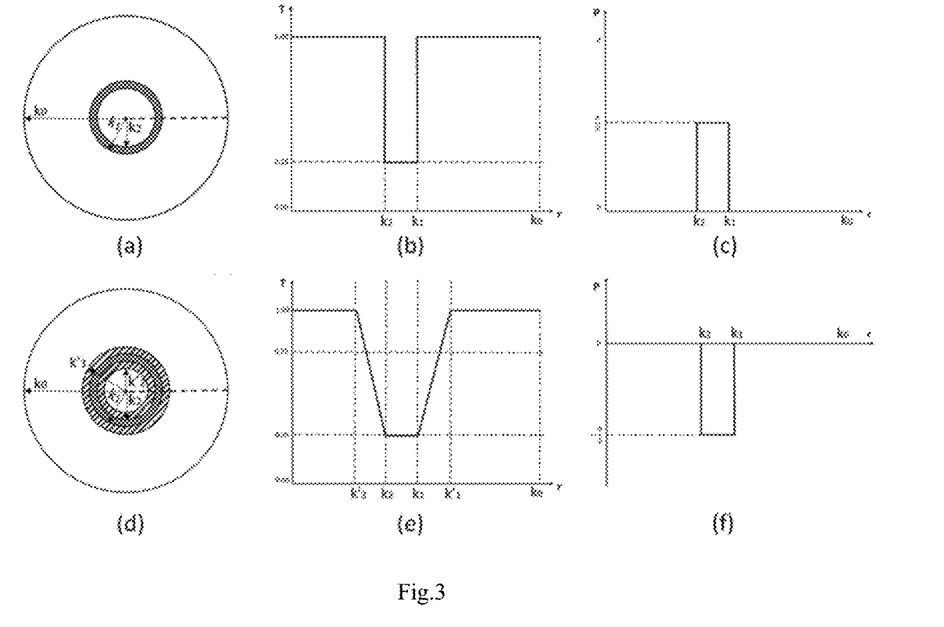
FIG. 3 shows the schematic diagram of different phase contrast rings in the phase contrast method.

Thus, $ATF_{PC-B}(u)$ and $PTF_{PC-B}(u)$ of the apodization phase contrast can be expressed as $$ATF_{PC-B}(u) = \frac{-\iint L(u_j)[P^*_{PC-B}(u_j)P_{PC-B}(u+u_j) + P_{PC-B}(u_j)P^*_{PC-B}(u-u_j)]d^2u_j}{\iint L(u_j)|P_{PC-B}(u_j)|^2 d^2u}$$

$$PTF_{PC-B}(u) = \frac{\iint L(u_j)[P^*_{PC-B}(u_j)P_{PC-B}(u+u_j) - P_{PC-B}(u_j)P^*_{PC-B}(u-u_j)]d^2u_j}{\iint L(u_j)|P_{PC-B}(u_j)|^2 d^2u_j}$$

where $k_0$ corresponds to the radius of the objective limit, $k_1$ is the outer diameter of the phase contrast ring with phase delay, $k_2$ is the inner diameter of the phase contrast ring with phase delay. In the simulated experimental plots shown in FIG. 4(a2), FIG. 4(a4), FIG. 4(b2), FIG. 4(b4) and FIG. 4(d1), the $NA_1=0.28$, $NA_2=0.25$, $NA_0=0.4$ are used. The phase difference ring with phase delay corresponds to the solid-filled ring in FIG. 3(d), and there is a $\pi/2$ phase delay with intensity attenuation effect, and the attenuation form is shown in FIG. 3(e). $k'_1$ and $k'_2$ is the overall outer and inner diameter of the phase contrast ring corresponding to the slash-filled ring in FIG. 3(d), there is only an intensity attenuation effect without phase delay, and the attenuation form is shown in FIG. 3(e). The algorithm can be used to adjust the width of the diagonal filling ring in FIG. 3(d), and to obtain different images of the variant phase contrast by changing the value of the numerical aperture of the objective $NA_0$, where the simulation results of changing the numerical aperture of the objective $NA_0$ can be seen in FIG. 4(d1) to FIG. 4(d4). The corresponding results of $ATF_{PC-B}(u)$ and $PTF_{PC-B}(u)$ are shown in FIG. 4(a4) and FIG. 4(b2). Thus, when the sample is partially illuminated by spatially coherent light, the obtained intensity spectrum of the apodization phase contrast $I_{PC-B}(u)$ can be written as the sum of the intensity spectrum at multiple illumination angles $$I_{PC-B}(u) = B_{PC-B}\delta(u) + A(u)ATF_{PC-B}(u) + i\Phi(u)PTF_{PC-B}(u)$$

This procedure results in the intensity image in the phase contrast (PC) imaging mode: the intensity image $I_{PC-A}(u)$ obtained by the annular phase contrast method and the intensity image $I_{PC-B}(u)$ obtained by the apodization phase contrast method, respectively.

Figure 5:
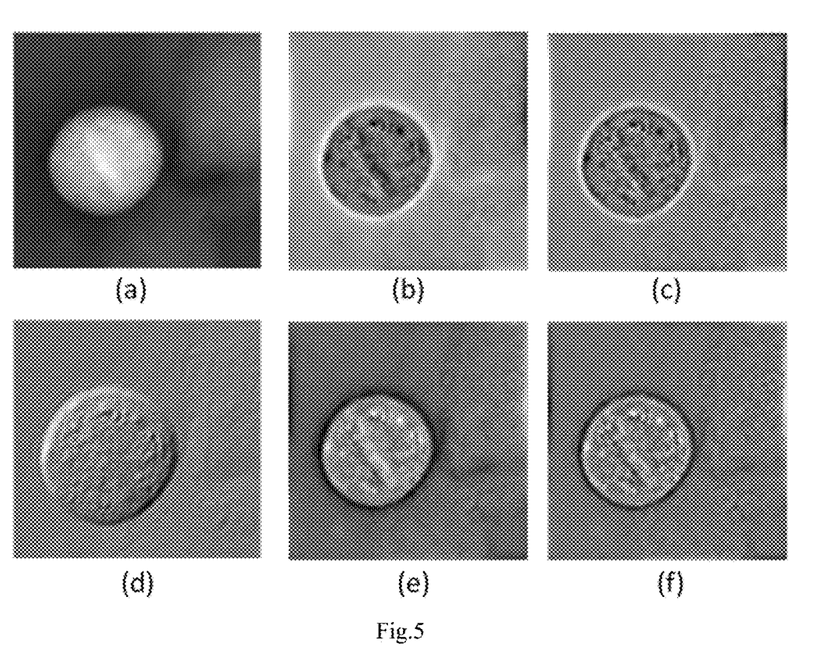
FIG. 5 shows a schematic diagram of the HeLa cell results of the present invention.

FIG. 5 shows the experimental results of the HeLa cell, i.e., the phase contrast and differential interference contrast intensity images obtained from the quantitative phase image obtained from the TIE shown in FIG. 5(a), using the above algorithm. Among them, FIG. 5(b) displays the annular positive phase contrast intensity map; FIG. 5(c) shows the apodization positive phase contrast intensity map; FIG. 5(d) shows the DIC intensity image; FIG. 5(e) shows the annular negative phase contrast intensity image; and FIG. 5(f) apodization negative phase contrast intensity image. Comparing the phase contrast and differential interference contrast image with the quantitative phase image, it can be seen that the phase contrast and differential interference contrast image obtained by the present algorithm can achieve higher contrast and richer details; comparing the phase contrast and differential interference contrast images via the proposed method with the phase contrast and differential interference contrast images obtained by the traditional method, it can be seen that the present algorithm can achieve the same imaging effect as the traditional phase contrast and differential interference contrast images. In summary, the present invention can endow the bright-field microscope with the ability to achieve phase contrast and differential interference contrast imaging without the need for complex modification of the traditional bright-field microscope. That is, only need to use an ordinary traditional bright-field microscope without adding any complicated components. Through the PC and DIC algorithms, this method has the advantages of quantitative, high-speed, low-cost, simple structure, and less external interference. In addition, it has the same imaging performance as the phase contrast microscope and differential interference contrast microscope, which are expensive, complex-structure, and has strict environmental conditions.

The invention claimed is:

1. A microscopic imaging method of phase contrast (PC) and differential interference contrast (DIC) based on the transport of intensity equation (TIE) comprising the steps of:
   acquring three intensity images along an optical axis, including a positive defocus image $I_{z-P}$, an infocus image $I_0$, and a negative defocus image $I_{z-N}$;
   obtaining a first-order axial differentiation $\partial I/\partial z$ of an intensity I using a numerical difference estimation:

$$\frac{\partial I}{\partial z} = \frac{I_{z-P} - I_{z-N}}{dz},$$

where dz is a distance between the positive defocus image $I_{z-P}$ and the negative defocus image $I_{z-N}$ in an axial direction Z;
   obtaining a quantitative phase image based on the TIE, wherein a quantitative phase $\phi$ is obtained by substituting the obtained first-order axial differentiation $\partial I/\partial z$ into TIE;
   solving the TIE in a differential interference contrast imaging mode, including using the obtained quantitative phase image to obtain an intensity image DIC(x,y)

in the differential interference contrast imaging mode based on a DIC imaging theory; and solving a phase transfer function in a phase contrast imaging mode, and solving the intensity image in the phase contrast imaging mode, including using the obtained quantitative phase image to obtain an intensity image $I_{PC-A}(u)$ by an annular phase contrast method and an intensity image $I_{PC-B}(u)$ using a phase contrast of apodization method based on a PC imaging theory.

2. The microscopic imaging method according to claim 1, wherein the step of obtaining the quantitative phase image further comprises:

solving the TIE using the obtained first-order axial differentiation $\partial I/\partial z$ according to:

$$-k\frac{\partial I}{\partial z} = \nabla \cdot (I \nabla \phi); \text{ and}$$

obtaining the quantitative phase $\phi$ by $$\phi = -k\nabla^{-2}\nabla \cdot \left(I^{-1}\nabla\nabla^{-2}\frac{\partial I}{\partial z}\right),$$

where k is a wave number, $k=2\pi/\lambda$, $\lambda$ is a wavelength, $\nabla$ is a gradient operator, · denotes dot product, $\nabla^{-2}$ is an inverse Laplacian operator.

3. The microscopic imaging method according to claim 1, wherein the step of solving the TIE further comprises:

(1) passing a beam of light through a Wollaston prism and dividing the beam of light into two coherent optical fields with $\Delta x$, $\Delta y$ shear;

(2) any one of the two coherent optical fields producing another phase shift of $\pi/2$, while the other one remaining unchanged;

(3) interfering and superimposing the two beams to form an intensity interferogram, thereby obtaining a final differential interference contrast image; and (4) obtaining the intensity image DIC(x,y) in the differential interference contrast imaging mode based on Fourier domain sub-pixel panning by:

$$U(x,y)=\sqrt{I_0}\exp[i\phi(x,y)]$$

$$U_A(x,y)=\exp(i\pi/2)FFT^{-1}\{\hat{U}(u_x,u_y)\exp[i2\pi(u_x\Delta x+u_y\Delta y)]\}$$

$$DIC(x,y)=|U(x,y)+U_A(x,y)|^2,$$

where $\hat{U}(u_x,u_y)=FFT\{U(x,y)\}$ is a Fourier transform of U(x,y), $(u_x,u_y)$ is a Fourier-domain coordinate corresponding to a space-domain coordinate (x,y), whose shear $\Delta x$,$\Delta y$ values are adjustable; when the shear $\Delta x$,$\Delta y$ is an integer, it can be solved directly in a space domain; when the shear $\Delta x$, $\Delta y$ is a fractional number, it needs to be converted to a frequency domain; a size of the shear $\Delta x$,$\Delta y$ determines convexity and concavity of the object in the differential interference contrast image; and positive and negative of the shear determines a shadow direction of the object in the differential interference contrast image.

4. The microscopic imaging method according to claim 3, wherein the step of solving the TIE further comprises:

generating an object optical field by:

$$U(x,y)=\sqrt{I_0}\exp[i\phi(x,y)],$$

where $I_0$ is the focus image obtained in the step of acquiring three intensity images, $\phi(x,y)$ is the $\phi$ obtained in the step of obtaining the quantitative phase image, obtaining a light field $U_A(x,y)$ after shearing $\Delta x$,$\Delta y$ and phase shifting $\pi/2$ by:

$$U_A(x,y)=U(x+\Delta x,y+\Delta y)=\sqrt{I(x+\Delta x,y+\Delta y)}\exp\{i[\phi(x+\Delta x,y+\Delta y)+\pi/2]\},$$

where $\Delta x$ is an amount of shear along an x-axis, $\Delta y$ is an amount of shear along a y-axis, and obtaining the intensity image DIC(x,y) formed by U(x,y) and $U_A(x,y)$ by:

$$DIC(x,y)=|U(x,y)+U_A(x,y)|^2=|\sqrt{I_0}\exp[i\phi(x,y)]+\sqrt{I(x+\Delta x,y+\Delta y)}\exp\{i[\phi(x+\Delta x,y+\Delta y)+\pi/2]\}|^2$$

where $\Delta x$,$\Delta y$ is integer N, a value of the integer is used to adjust an amount of shear and positive and negative of the integer is used to adjust a direction of shear; DIC(x,y) is the obtained DIC intensity image;

wherein:

① for a case of uniform intensity where $I_0=1$, the DIC imaging theory is based on:

$$U(x,y)=\exp[i\phi(x,y)]$$

$$DIC(x,y)=|\exp[i\phi(x,y)]+\exp\{i[\phi(x+\Delta x,y+\Delta y)+\pi/2]\}|^2,$$

② for weakly phased objects for uneven intensity, the DIC imaging theory is based on:

$$U(x,y)=\sqrt{I_0}\exp[i\phi(x,y)]=\sqrt{I_0}[1+i\phi(x,y)]$$

$$DIC(x,y)=I_0\{1+[\phi(x,y)-\phi(x+\Delta x,y+\Delta y)]\},$$

③ for weakly phased objects for uniform intensity, thus $$U(x,y)=\exp[i\phi(x,y)]=1+i\phi(x,y)$$

$$DIC(x,y)=1+[\phi(x,y)-\phi(x+\Delta x,y+\Delta y)],$$

④ for a case of slowly varying intensity $\sqrt{I_0}\approx\sqrt{I(x+\Delta x,y+\Delta y)}$, the DIC imaging theory is based on:

$$DIC(x,y)=|\sqrt{I(x+\Delta x,y+\Delta y)}[\exp[i\phi(x,y)]+\exp\{i[\phi(x+\Delta x,y+\Delta y)+\pi/2]\}]|$$

5. The microscopic imaging method according to claim 1, wherein in the step of solving the phase transfer function, obtaining the intensity image $I_{PC-A}(u)$ by the annular phase contrast method based on a phase contrast imaging theory comprises:

using an annular illumination, wherein a phase difference plate is annular, and an intensity of the object and an optical field of the object U(x,y) generated by a phase recovery are obtained by $$U(x,y)=\sqrt{I_0}\exp[i\phi(x,y)],$$

$$I(u) = B\delta(u) + A(u)ATF(u) + i\Phi(u)PTF(u)$$

$$B = \int\int L(u_j)|P(u_j)|^2 d^2u_j$$

$$ATF(u) = \frac{-\int\int L(u_j)[P^*(u_j)P(u+u_j) + P(u_j)P^*(u-u_j)]d^2u_j}{\int\int L(u_j)|P(u_j)|^2 d^2u_j},$$

$$PTF(u) = \frac{\int\int L(u_j)[P^*(u_j)P(u+u_j) - P(u_j)P^*(u-u_j)]d^2u_j}{\int\int L(u_j)|P(u_j)|^2 d^2u_j},$$

where $I_0$ is the focus image obtained in the step of acquiring three intensity images, $\phi(x,y)$ is the phase image $\phi$ obtained in the step of obtaining the quantitative phase image, u denotes a frequency coordinate in Fourier space; I(u) is an intensity spectrum distribution; B indicates background items; A(u) is an amplitude spectrum distribution of a sample; ATF(u) denotes an amplitude transfer function; Φ(u) is a phase spectrum distribution of the sample; PTF(u) denotes a phase transfer function; $u_j$ is a corresponding frequency shift vector caused by a single tilted illumination, j indicates different angles of illumination; $L(u_j)$ denotes an intensity distribution of an illumination source in a Fourier domain; P(u) is a pupil function of an objective lens; * denotes a conjugate operation, wherein in a case of annular phase contrast, a light source expression for an annular illumination mode L(u) is $$L(u) = \begin{cases} 1, & k_2^2 < u_x^2 + u_y^2 < k_1^2 \\ 0, & \text{others} \end{cases},$$

wherein the pupil function under the annular phase contrast $P_{PC-A}(u)$ is $$P_{PCA}(u) = \begin{cases} 1, & k_1^2 < u_x^2 + u_y^2 < k_0^2 \\ 0.25 \times \exp\left(i\frac{\pi}{2}\right), & k_2^2 < u_x^2 + u_y^2 < k_1^2 \\ 1, & u_x^2 + u_y^2 < k_2^2 \\ 0, & \text{others} \end{cases}$$

$k_i = NA_i/\lambda \ (i = 0, 1, 2),$ where $(u_x, u_y)$ is a Fourier-domain coordinate corresponding to a space-domain coordinate (x,y), λ is wavelength, $k_0$ is a radius of a corresponding objective limit, $k_1$ is an outer diameter of a phase contrast ring, k2 is an inner diameter of the phase contrast ring; an integration area of a ring illumination corresponds to the phase contrast ring, and an annular phase contrast of $ATF_{PC-A}(u)$ and $PTF_{PC-A}(u)$ is expressed as $$ATF_{PC-A}(u) = \frac{-\int\int L(u_j)[P^*_{PC-A}(u_j)P_{PC-A}(u+u_j) + P_{PC-A}(u_j)P^*_{PC-A}(u-u_j)]d^2u_j}{\int\int L(u_j)|P_{PC-A}(u_j)|^2 d^2u_j}$$

$$PTF_{PC-A}(u) = \frac{\int\int L(u_j)[P^*_{PC-A}(u_j)P_{PC-A}(u+u_j) - P_{PC-A}(u_j)P^*_{PC-A}(u-u_j)]d^2u_j}{\int\int L(u_j)|P_{PC-A}(u_j)|^2 d^2u_j},$$

wherein when the sample is partially illuminated by spatially coherent light, a resulting annular phase contrast intensity spectrum $I_{PC-A}$ (u) is a sum of an intensity spectra at multiple illumination angles:

$I_{PC-A}(U) = B_{PC-A}\delta(u) + A(u)ATF_{PC-A}(u) + i\Phi(u)PTF_{PC-A}(u)$,

6. The microscopic imaging method according to claim 5, the intensity image $I_{PC-B}(u)$ is obtained by an apodization phase contrast method in which a pupil function $P_{PC-B}(u)$ is expressed by a formula of:

$$P_{PC-B}(u) = \begin{cases} 1, & k_1'^2 < u_x^2 + u_y^2 < k_0^2 \\ \frac{3}{4(k_1'-k_1)}u_x + \left[1 - \frac{3}{4(k_1'-k_1)}k_1\right], & k_1^2 < u_x^2 + u_y^2 < k_1'^2 \\ 0.25 \times \exp\left(i\frac{\pi}{2}\right), & k_2^2 < u_x^2 + u_y^2 < k_1^2 \\ \frac{-3}{4(k_2-k_1')}u_x + \left[1 + \frac{3}{4(k_2-k_1')}k_2\right], & k_2'^2 < u_x^2 + u_y^2 < k_2^2 \\ 1, & u_x^2 + u_y^2 < k_2'^2 \\ 0, & \text{others} \end{cases}$$

$k_i = NA_i/\lambda, \ i = 0, 1, 2,$ $ATF_{PC-B}(u)$ and $PTF_{PC-B}(u)$ of the apodization phase contrast are expressed as $$ATF_{PC-B}(u) = \frac{\int\int L(u_j)[P^*_{PC-B}(u_j)P_{PC-B}(u+u_j) + P_{PC-B}(u_j)P^*_{PC-B}(u-u_j)]d^2u_j}{\int\int L(u_j)|P_{PC-B}(u_j)|^2 d^2u_j}$$

$$PTF_{PC-B}(u) = \frac{\int\int L(u_j)[P^*_{PC-B}(u_j)P_{PC-B}(u+u_j) - P_{PC-B}(u_j)P^*_{PC-B}(u-u_j)]d^2u_j}{\int\int L(u_j)|P_{PC-B}(u_j)|^2 d^2u_j},$$

where $k_0$ corresponds to the radius of the objective limit, $k_1$ is the outer diameter of the phase contrast ring with phase delay, $k_2$ is the inner diameter of the phase contrast ring with phase delay, $k'_1$ and $k'_2$ is overall outer and inner diameter of the phase contrast ring;

wherein when a sample is partially illuminated by spatially coherent light, an intensity spectrum of the apodization phase contrast $I_{PC-B}(u)$ is a sum of an intensity spectra at multiple illumination angles:

$I_{PC-B}(u) = B_{PC-B}\delta(u) + A(u)ATF_{PC-B}(u) + i\Phi(u)PTF_{PC-B}(u)$, thereby obtaining an intensity image in a phase contrast PC imaging mode.

7. The microscopic imaging method according to claim 1, wherein in the step of solving the phase transfer function, the intensity image $I_{PC-B}$ (u) is obtained by an apodization phase contrast method in which a pupil function $P_{Pc-B}(u)$ is expressed by a formula of:

$$P_{PC-B}(u) = \begin{cases} 1, & k_1'^2 < u_x^2 + u_y^2 < k_0^2 \\ \frac{3}{4(k_1'-k_1)}u_x + \left[1 - \frac{3}{4(k_1'-k_1)}k_1\right], & k_1^2 < u_x^2 + u_y^2 < k_1'^2 \\ 0.25 \times \exp\left(i\frac{\pi}{2}\right), & k_2^2 < u_x^2 + u_y^2 < k_1^2 \\ \frac{-3}{4(k_2-k_2')}u_x + \left[1 + \frac{3}{4(k_2-k_2')}k_2\right], & k_2'^2 < u_X^2 + u_y^2 < k_2^2 \\ 1, & u_x^2 + u_y^2 < k_2'^2 \\ 0, & \text{others} \end{cases}$$

$k_i = NA_i/\lambda, \ i = 0, 1, 2,$ $ATF_{PC-B}(u)$ and $PTF_{PC-B}(u)$ of the apodization phase contrast are expressed as $$ATF_{PC-B}(u) = \frac{-\iint L(u_j)[P^*_{PC-B}(u_j)P_{PC-B}(u+u_j) + P_{PC-B}(u_j)P^*_{PC-B}(u-u_j)]d^2u_j}{\iint L(u_j)|P_{PC-B}(u_j)|^2 d^2u_j}$$

$$PTF_{PC-B}(u) = \frac{\iint L(u_j)[P^*_{PC-B}(u_j)P_{PC-B}(u+u_j) - P_{PC-B}(u_j)P^*_{PC-B}(u-u_j)]d^2u_j}{\iint L(u_j)|P_{PC-B}(u_j)|^2 d^2u_j},$$

where $k_0$ corresponds to a radius of an objective limit, $k_1$ is an outer diameter of a phase contrast ring with phase delay, $k_2$ is an inner diameter of the phase contrast ring with phase delay, $k'_1$ and $k'_2$ is overall outer and inner diameter of the phase contrast ring;

wherein when a sample is partially illuminated by spatially coherent light, an intensity spectrum of the apodization phase contrast $I_{PC-B}(u)$ is a sum of an intensity spectra at multiple illumination angles:

$I_{PC-B}(u) = B_{PC-B}\delta(u) + A(u)ATF_{PC-B}(u) + i\Phi(u)PTF_{PC-B}(u)$, thereby obtaining an intensity image in a phase contrast PC imaging mode.

* * * * *